United States Patent [19]

Barna

[11] 4,314,724
[45] Feb. 9, 1982

[54] HAND HELD TONGS

[76] Inventor: Stephen L. Barna, 1129 N. State Rd., Ionia, Mich. 48846

[21] Appl. No.: 76,262

[22] Filed: Sep. 17, 1979

[51] Int. Cl.³ ............................ A47J 19/02; B25B 9/02
[52] U.S. Cl. ..................... 294/99 R; 30/326; 99/323; 403/354
[58] Field of Search ................. 294/7, 8, 8.5, 11, 16, 294/26.5, 33, 99 R, 99 S; D7/47, 48, 105, 107; 30/150, 325, 326, 337, 338; 81/43; 99/323; 100/133, 234; 403/289, 290, 354; 24/16 R, 16 PB, 211 R, 211 L, 214; 292/320, 322

[56] References Cited

U.S. PATENT DOCUMENTS

| 434,295 | 8/1890 | Richardi | 403/289 X |
|---|---|---|---|
| 1,178,044 | 4/1916 | Adams | 99/323 |
| 1,964,897 | 7/1934 | Wenk | 292/320 |
| 2,533,947 | 12/1950 | Lipnicki et al. | 99/323 X |
| 2,969,570 | 1/1961 | Petri et al. | 292/322 X |
| 3,367,701 | 2/1968 | Wenk | 24/16 PB |
| 3,697,104 | 10/1972 | Soulie et al. | 403/290 X |

FOREIGN PATENT DOCUMENTS

| 677653 | 3/1930 | France | 294/16 |
|---|---|---|---|
| 742955 | 3/1933 | France | 294/99 R |
| 811925 | 4/1937 | France | 294/99 S |
| 250036 | 8/1947 | Switzerland | 99/323 |
| 10574 | of 1908 | United Kingdom | 294/99 R |
| 454171 | 9/1936 | United Kingdom | 294/99 R |

Primary Examiner—Johnny D. Cherry
Attorney, Agent, or Firm—Price, Heneveld, Huizenga & Cooper

[57] ABSTRACT

This specification discloses a pair of tongs comprising two arms interconnected by flexible leaf spring, having a substantially linear shape in a free condition, and being flexed into a tensed, U-shaped configuration when connected with the tong's arms, such that the leaf spring both pivotally interconnects the tong arms and resiliently urges the same apart.

2 Claims, 7 Drawing Figures

HAND HELD TONGS

BACKGROUND OF THE INVENTION

The present invention relates to tongs, and in particular to a leaf spring arrangement for hand held tongs.

Hand held tongs are used extensively to manipulate a great variety of household items, such as ice, firewood, and the like, and are particularly adapted for use in the design of kitchen utensils for the culinary arts. One application for the tong and leaf spring arrangement of the present invention pertains to kitchen utensils, which are particularly designed for making flavored beverages, such as that disclosed in my copending application, Ser. No. 76,487, filed Sept. 17, 1979. Such kitchen utensils typically are used in the preparation of hot drinks, by placing a flavoring agent in a perforated bowl portion of the device, and flowing hot water therethrough, such that the essence of the flavoring agent is imparted to the water. Heretofore, such devices were of a complicated, rather intricate design, such as that disclosed in the Gray U.S. Pat. No. 453,972, with several small interlocking parts to open and close the foraminous bowl members. Such utensils are not only quite costly to manufacture, but are also cumbersome to operate, easily damaged, and deteriorate quickly, particularly when used with highly acidic, hot beverages such as tea. One particularly difficult problem experienced with such utensils relates to the spring mechanism which facilitates the manipulation of the utensil bowl portions. The spring mechanism must be quite durable to avoid fatiguing or losing its resiliency after repeated bending. As a result, many such utensils are fabricated of spring steel or other similarly resilient materials which are quite costly, and difficult to form.

SUMMARY OF THE INVENTION

The present invention provides a leaf spring arrangement for hand held tongs which is simple and economical in construction, and also lightweight and durable. A fastener is provided for securely connecting each of the ends of the leaf spring with the tong arms.

The present invention also makes it possible to make cross-over tongs of plastic without requiring a complicated mold. One can mold the two tong arms separately and then connect them in a crossed over fashion with the leaf spring connector portion.

These and many other important advantages of the invention will be further understood and appreciated by those skilled in the art by reference to the following written specification, claims, and appended drawings.

DETAILED DESCRIPTION OF THE PREFERRED EMBODIMENTS

Figure 1:
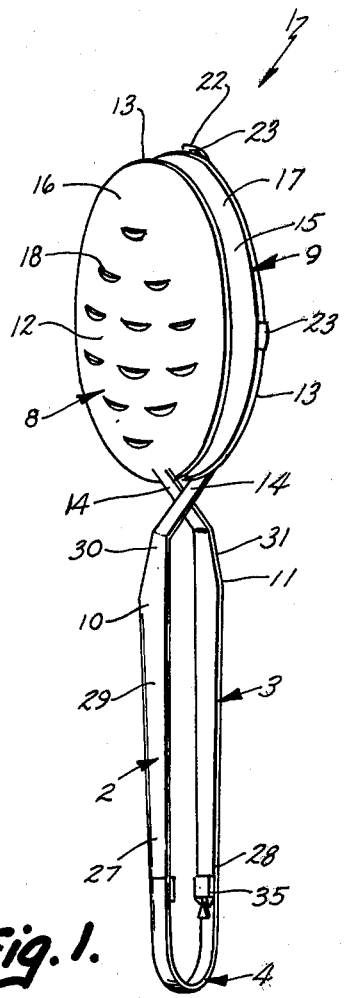
FIG. 1 is a perspective view of a pair of hand held tongs embodying the present invention.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

Figure 2:
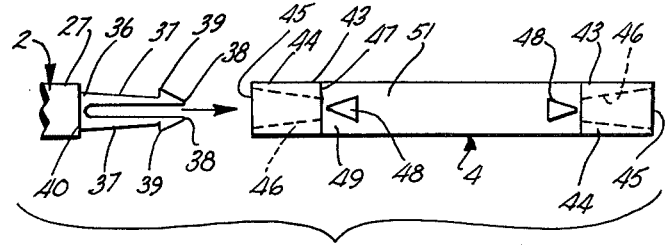
FIG. 2 is a fragmentary plan view of a fastener portion of the tongs, shown in a disassembled condition.
Figure 3:
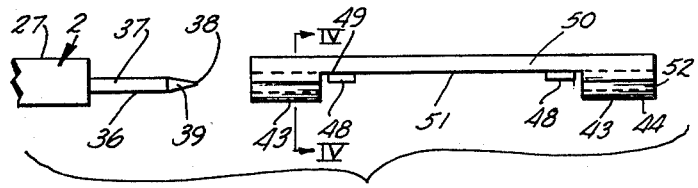
FIG. 3 is a fragmentary, side elevational view of the fastener, shown in a disassembled condition.

The reference numeral 1 generally designates a pair of tongs embodying the present invention, and comprises two arms 2 and 3 which are interconnected by a flexible leaf spring 4. The leaf spring 4 has a substantially linear shape in a free condition, as illustrated in FIGS. 2 and 3, and is flexed into a tense, U-shaped configuration, as shown in FIG. 1, when connected with the tong arms 2 and 3, such that the leaf spring both pivotally interconnects the tong arms and resiliently urges the same apart.

In the embodiment illustrated in FIG. 1, the tongs 1 comprise a kitchen utensil for making flavored beverages, such as hot tea, and the like. However, it is to be understood that the present invention contemplates the use of such a structure with virtually any hand held tong arrangement. The illustrated utensil 1 includes a pair of bowl members 8 and 9 attached to the upper end 10 and 11 of the arms 2 and 3 respectively (as oriented in FIG. 1). The bowl members 8 and 9 are spoon-shaped or dished, and include a concave base 12 and a free, marginal edge 13. The bowl members are connected with the arm members 2 and 3 by inclined connecting legs 14, and are oriented thereon with the free edges 13 substantially aligned and facing each other, whereby the bowls matingly abut in a closed position to form a cavity 15 therebetween, and are spaced apart in an open position to access the cavity. The cavity 15 is shaped to receive and retain a variety of different types of flavoring agents (not shown) therein. The illustrated bowl members 8 and 9 each have a generally ovate shape, with a convex exterior surface 16 and a concave interior surface 17. At least one of the bowl members has an aperture 18 therethrough which is sized for communicating the flavoring agent with a fluid, yet preventing the flavoring agent substrate from flowing therethrough. In the illustrated structure, both of the bowl members 8 and 9 include a plurality of apertures 18 therethrough which permit the fluid to flow transversely through the utensil. Preferably, each of the apertures 18 comprises a molded slot, and the same are positioned in a predetermined pattern on each of the bowl members, with a plurality of the slots arranged in a side-by-side fashion through the medial portion of the bowl members, and decreasing regularly therefrom to the upper and lower end portions of the bowls.

A locking arrangement 22 is provided to positively interconnect the bowl members 8 and 9 in a closed position, so as to prevent the flavoring agent substrate from inadvertently escaping from the cavity 15 during use and ruining the beverage. The illustrated locking arrangement comprises three snap-lock channel segments or latches 23 which are spaced regularly about the outer periphery of the bowl member 9. The latches 23 include a groove therein which is adapted to receive a mating portion of the marginal edge 13 of the bowl member 8 therein, and securely interconnect the bowl members.

The arms 2 and 3 include lower ends 27 and 28 (as oriented in FIG. 1), which are pivotally interconnected by the leaf spring 4 to selectively converge and diverge the upper ends 10 and 11 of the arms. In the example illustrated in FIG. 1, the arms 2 and 3 taper slightly outwardly from the lower ends 27 and 28 to the upper ends 10 and 11, and include an exterior surface 29 which is adapted for grasping by the user to facilitate manipulation of the utensil. The exterior surface 29 of both of the arms is preferably arcuately shaped to comfortably fit the user's hand, and may be textured to alleviate slippage. The upper ends 10 and 11 of each of the arms includes a trapezoidal portion 30 with a side edge thereof inclined inwardly toward the medial portion of the arm. The connecting leg 14 extends from each of the trapezoidal portions 30, inwardly along edge 31 toward the opposing arm at an obtuse angle. Each set of bowl members, connecting legs, and arms (ie. 8, 14, and 3; and 9, 14, and 2) are preferably intergrally formed in a one-piece construction, and are fabricated from a plastic material.

A fastener arrangement 34 is provided for connecting the ends of the leaf spring with the lower ends 27 and 28 of the tong arms 2 and 3. As best illustrated in FIGS. 2-7, the fastener 34 comprises a plug 36 which is adapted for connection with either an arm end or a leaf spring end, and in the illustrated structure extends longitudinally from each of the lower arm ends 27 and 28. The plug 36 includes a pair of prongs 37 which are positioned in a spaced apart and substantially parallel relationship. The prongs have free ends 38 which are converged along an imaginary plane during use, and have opposing barbs 39 thereon which project outwardly of the prongs along the aformentioned imaginary plane. The prongs 37 are preferably semi-rigid and resilient, such that they normally assume the spaced apart, parallel relationship illustrated in FIG. 2. The prongs 37 taper slightly inwardly from a base portion 40 (FIG. 2) thereof to the free ends 38 to provide additional resiliency and strength thereto.

Figure 5:
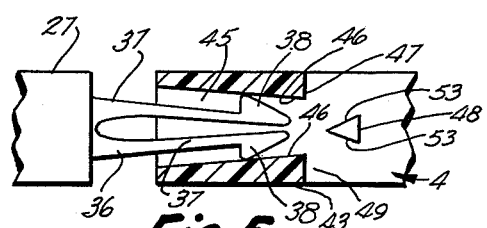
FIG. 5 is an enlarged fragmentary cross-sectional view of the fastener shown in a first, partially assembled condition.

The fastener 35 also includes a receptacle 43 which is connected with an opposite tong portion from the plug, which in the illustrated structure is the leaf spring ends. The receptacle 43 includes a sleeve 44 having a central aperture 45 shaped to receive the prongs 37 therein in a locked position. The aperture 45 is defined by inwardly tapered side walls 46 which abut the barbs 39 on the free ends 38 of the prongs and converge the same during insertion of the prongs into the sleeve 44 as illustrated in FIG. 5. An anchor mechanism 47 is disposed adjacent opposing sides of the prongs in the locked position (FIG. 7), and abuttingly engages the barbs 39 and prevents inadvertent withdrawal of the plug 36 from the receptacle 43. A wedge 48 is positioned between the prong free ends 38 in the locked position, and is spaced apart from the anchors 47 on the trailing side 49 thereof a distance such that the wedge 48 abuts the prong free ends 38 and diverges the same, thereby positively setting the barbs 39 in the anchors 47 to securely interconnect the tong arms with the leaf spring.

Figure 4:
FIG. 4 is a cross-sectional view of the fastener taken along the line IV—IV, FIG. 3.

The illustrated leaf spring 4 is integrally molded with a receptacle 43 at each end thereof; from a resilient synthetic resin material, such as polystyrene, polypropylene, or the like. The exterior surface 50 of the molded leaf spring is arcuately shaped to mate with the exterior surface 29 of the tong arms, and the receptacles 43 are formed on an interior surface 51 thereof, and include flat side edges 52 which mate with the side edges of the tong arms to provide a smooth, neat appearance. The aperture 45 has a substantially trapezoidal planar shape (FIG. 2), and a substantially rectangular transverse cross-sectional shape (FIG. 4). The wedges 48 are preferably integrally molded with the leaf spring 4 and project outwardly of the interior surface 51 thereof. The wedges have a triangular shape with inclined surfaces 53 (FIG. 5) which extends into the insertion path of the prong free ends so as to abuttingly engage the same.

Figure 6:
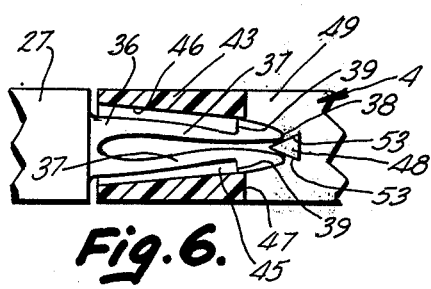
FIG. 6 is an enlarged, fragmentary cross-sectional view of the fastener, shown in a second, partially assembled condition.

In the illustrated structure, the anchors 47 comprise the trailing end edge of the sleeve 44, and include a surface of sufficient width to receive the prong barbs thereon. As best illustrated in FIG. 6, the inclined surfaces 53 of the wedge 48 are positioned a predetermined distance from the trailing end surface 47 of the sleeve, in accordance with the size of the barbs 39, such that the prong free ends 38 abut the wedge at a position upstream of the locked position (as shown in FIG. 6). Continued insertion of the prongs 37 into the sleeve 44 pivots the barbs inwardly until the locked position is achieved, at which time the barbs both pivot and translate outwardly into engagement with the anchors to form a permanent connection between the leaf spring and the tong arms. The abutting contact between the wedge 48 and the inclined sleeve side wall 46 causes the barbs to rotate or pivot in a direction away from the wedge (as viewed in FIG. 6). Hence, to release the plug from the receptacle, the prongs 37 must not only be converged, but the same must also be pivoted in the opposite direction to clear the barbs from the anchoring surface 47. In this manner, the fastening mechanism forms a permanent connection which cannot be inadvertently disconnected.

Figure 7:
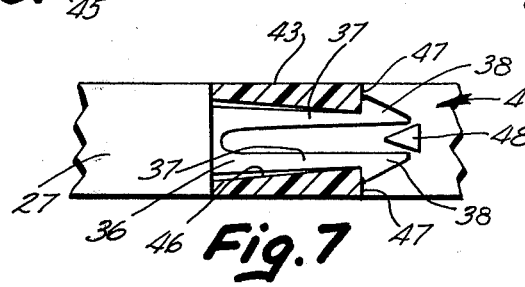
FIG. 7 is an enlarged, fragmentary cross-sectional view of the fastener, shown in a fully assembled, locked position.

In use, the leaf spring 4 is connected with the tong arms 2 and 3 by orienting the sleeves 44 toward the interior surface of the tong arms. The projecting fastener plugs 36 are then inserted into an associated one of the receptacles 43. As the prongs 37 are inserted into the associated sleeve 44, the inclined side walls 46 thereof resiliently converge the prong free ends 38, as shown in FIG. 5. The free ends of the prongs then engage the wedge 48 which positively diverges the prong free ends and resiliently pivots the same as shown in FIG. 6. When the barbs 39 clear the trailing anchor surface 47 of the sleeve, the prongs both resiliently diverge and pivot to their normal, free position as shown in FIG. 7, wherein the barbs engage the anchor surfaces and prevent inadvertent withdrawal of the plug from the receptacle. The leaf spring 4 is then bent into a U-shaped configuration, and the prong arm upper ends are crossed over to place the bowl members 8 and 9 in a substantially aligned orientation, wherein the free edges 13 face toward each other and form the cavity 15 thereinbetween. The leaf spring 4 resiliently diverges the upper ends 10 and 11 of the arms, thereby retaining the bowls 8 and 9 in a closed position. Convergence of the tong arms 2 and 3 by the user causes the bowls to separate, thereby opening the cavity and permitting the user to insert a flavoring agent therein. After the flavoring agent has been inserted into the bowl, the user simply releases his grip on the tong arms and the resiliency of the leaf spring 4 causes the bowl members 8 and 9 to automatically converge and snap into a locked position.

In the foregoing description, it will be readily appreciated by those skilled in the art that many modifications may be made to the invention without departing from the concepts disclosed herein. For example, by eliminating the locking latches 22, 23 on bowl member 9, one can mold both arm and bowl members 2, 9 and 3, 8 respectively, in the same mold. They are then joined by spring 4. Such modifications are to be considered as included in the following claims unless these claims by their language expressly state otherwise.

The embodiments of the invention in which an exclusive property or privilege is claimed are defined as follows.

1. A pair of hand held tongs comprising:
a pair of substantially rigid arms adapted for grasping, and having first and second ends; said second arm ends being shaped to clench an object therebetween;
a substantially flat, resiliently flexible leaf spring constructed of a synthetic resin material, and having a resilient body with first and second ends;
means connecting said first and second leaf spring ends with a different one of said arm first ends; and wherein
said leaf spring has a substantially linear shape in a free condition and is elastically flexed into a U-shaped configuration in a tensed condition when connected with said tong arms, whereby said leaf spring both pivotally interconnects said tong arms and resiliently urges the same apart; and wherein said connecting means comprises:
a plug connected with one of said arm first ends and said leaf spring ends, and having a pair of prongs positioned in a spaced apart and substantially parallel relationship; said prongs having free ends which are converged along a plane during use, and have opposing barbs thereon projecting outwardly of said prongs along said plane;
a receptacle connected with the other of said arm first ends and said leaf spring ends, and comprising:
a sleeve having a central aperture shaped to receive said prongs therein in a locked position and including inwardly tapered sidewalls which abut the prong free ends and converge the same during insertion of the prongs into the sleeve;
anchor means disposed adjacent opposing sides of said prongs in the locked position, and abuttingly engaging said barbs and preventing inadvertent withdrawal of said plug from said receptacle; and
a wedge positioned between said prong free ends in the locked position, and being spaced apart from said anchor means on a trailing side thereof a distance such that said wedge abuts said prong free ends and diverges the same, thereby positively setting the barbs in the anchor means to securely connect said one tong arm with said leaf spring.

2. A pair of tongs comprising:
a pair of substantially rigid arms having first and second ends; said second arm ends being shaped to grasp an object therebetween;
a flexible leaf spring having a resilient body and first and second ends;
means connecting said first and second leaf spring ends with a different one of said arm first ends, and comprising:
a plug connected with one of said arm first ends and said leaf spring ends, and having a pair of prongs positioned in a spaced apart and substantially parallel relationship; said prongs having free ends which are converged along a plane during use, and have opposing barbs thereon projecting outwardly of said prongs along said plane;
a receptacle connected with the other of said arm first ends and said leaf spring ends, and comprising a sleeve having a central aperture shaped to receive said prongs therein in a locked position, and anchor means disposed adjacent opposing sides of said prongs in the locked position, and abuttingly engaging said barbs and preventing inadvertent withdrawal of said plug from said receptacle; and wherein
said leaf spring has a substantially linear shape in a free condition and is elastically flexed into a U-shaped configuration in a tensed condition when connected with said tong arms, whereby said leaf spring both pivotally interconnects said tong arms and resiliently urges the same apart.

* * * * *

UNITED STATES PATENT AND TRADEMARK OFFICE
CERTIFICATE OF CORRECTION

PATENT NO. : 4,314,724
DATED : February 9, 1982
INVENTOR(S) : Steven L. Barna

It is certified that error appears in the above—identified patent and that said Letters Patent is hereby corrected as shown below:

Column 3, line 24:

"34" should be --35--

Column 3, line 27:

"34" should be --35--

Signed and Sealed this

Twenty-seventh Day of July 1982

[SEAL]

Attest:

Attesting Officer

GERALD J. MOSSINGHOFF

*Commissioner of Patents and Trademarks*